US010410332B2

(12) United States Patent
Ahn et al.

(10) Patent No.: US 10,410,332 B2
(45) Date of Patent: Sep. 10, 2019

(54) METHOD OF ANALYZING LATTICE STRAIN OF SEMICONDUCTOR DEVICE

(71) Applicant: SAMSUNG ELECTRONICS CO., LTD., Suwon-si, Gyeonggi-Do (KR)

(72) Inventors: Myoung-Ki Ahn, Yongin-si (KR); Gwang-Seon Byun, Yongin-si (KR); Han-Saem Park, Seoul (KR); Hyun-Koo Kwak, Suwon-si (KR); Su-Bong Shon, Suwon-si (KR); Ung-Keun Cho, Seongnam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 305 days.

(21) Appl. No.: 15/422,058

(22) Filed: Feb. 1, 2017

(65) Prior Publication Data

US 2018/0012348 A1    Jan. 11, 2018

(30) Foreign Application Priority Data

Jul. 8, 2016  (KR) .......................... 10-2016-0087116

(51) Int. Cl.
*G06K 9/00* (2006.01)
*G06T 7/00* (2017.01)
*G06T 5/10* (2006.01)
*G06T 5/20* (2006.01)

(52) U.S. Cl.
CPC .............. *G06T 7/0004* (2013.01); *G06T 5/10* (2013.01); *G06T 5/20* (2013.01); *G06T 2207/10056* (2013.01); *G06T 2207/20056* (2013.01); *G06T 2207/30148* (2013.01)

(58) Field of Classification Search
CPC . G06T 2207/10056; G06T 2207/20056; G06T 2207/30148; G06T 5/10; G06T 5/20; G06T 7/0004
See application file for complete search history.

(56) References Cited

U.S. PATENT DOCUMENTS

| 5,311,600 | A  | 5/1994  | Aghajan et al. |
| 7,365,659 | B1 | 4/2008  | Yun et al. |
| 8,411,711 | B2 | 4/2013  | Gubenko et al. |
| 8,859,965 | B2 | 10/2014 | Nojima |
| 8,921,787 | B2 | 12/2014 | Own et al. |
| 9,274,070 | B2 | 3/2016  | Weiss et al. |

(Continued)

FOREIGN PATENT DOCUMENTS

JP    2014-075192    4/2014

OTHER PUBLICATIONS

M.J. Hytch, et al., "Quantitative Measurement of Displacement and Strain Fields From HREM Micrographs," Ultramicroscopy 74 (1998) pp. 131-146.

*Primary Examiner* — Nirav G Patel
(74) *Attorney, Agent, or Firm* — F. Chau & Associates, LLC

(57) ABSTRACT

A method of analyzing lattice strain of a semiconductor device includes generating a spectrum image by performing a Fourier Transform on an image of a semiconductor device, providing a first hybrid mask filter t filter designed to select at least one peak frequency from the spectrum image, filtering the spectrum image using the first hybrid mask filter to generate a filtered spectrum image, and generating a first strain image by performing an inverse Fourier Transform on the filtered spectrum image.

19 Claims, 19 Drawing Sheets

(56) References Cited

U.S. PATENT DOCUMENTS

2004/0051524 A1\* 3/2004 Wellstood .............. G01N 27/82
 324/248
2011/0084209 A1 4/2011 Chung et al.
2015/0228065 A1 8/2015 Biring \* cited by examiner

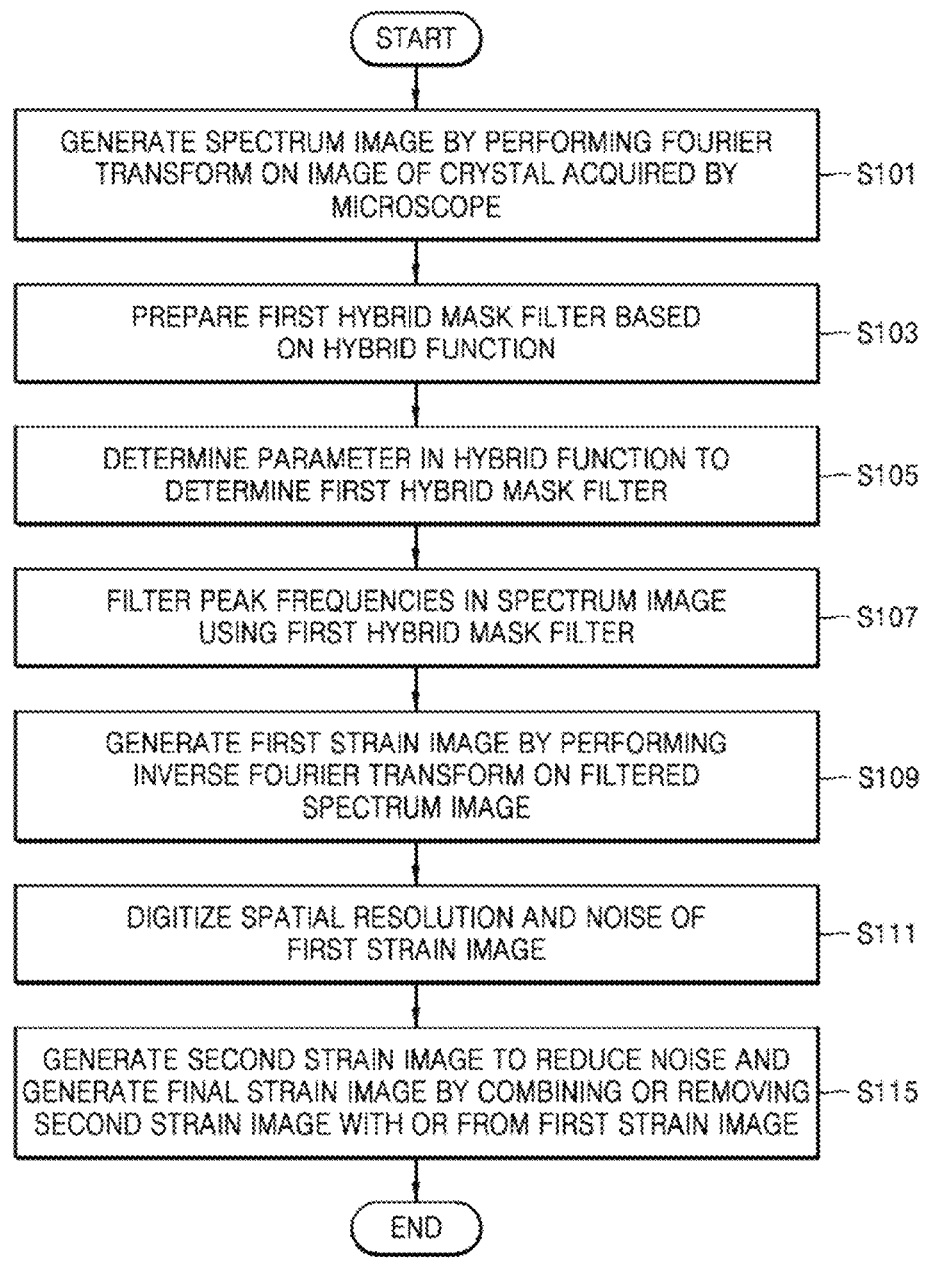

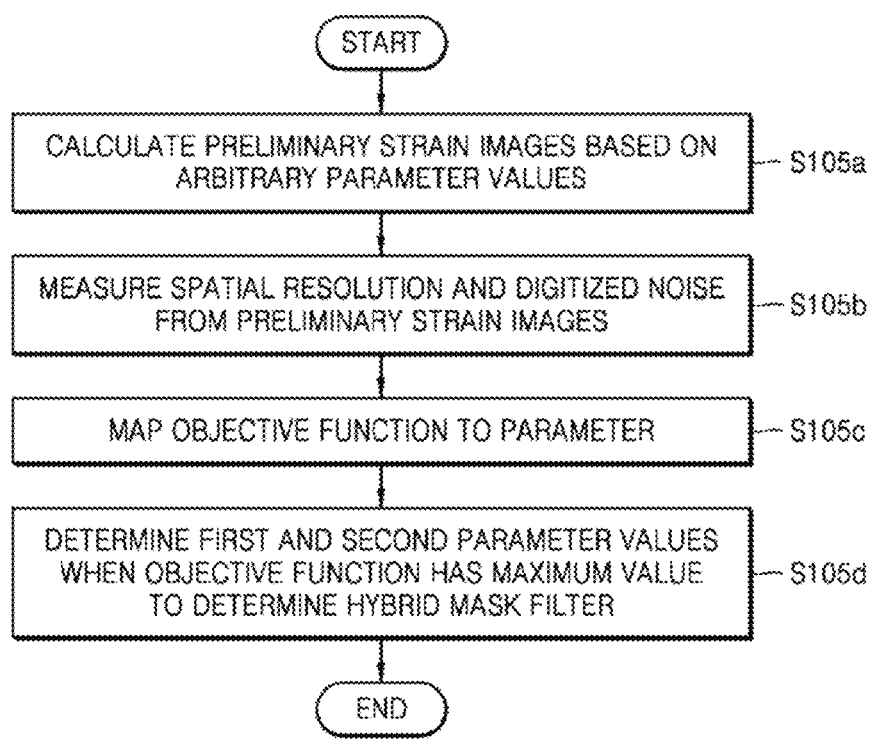

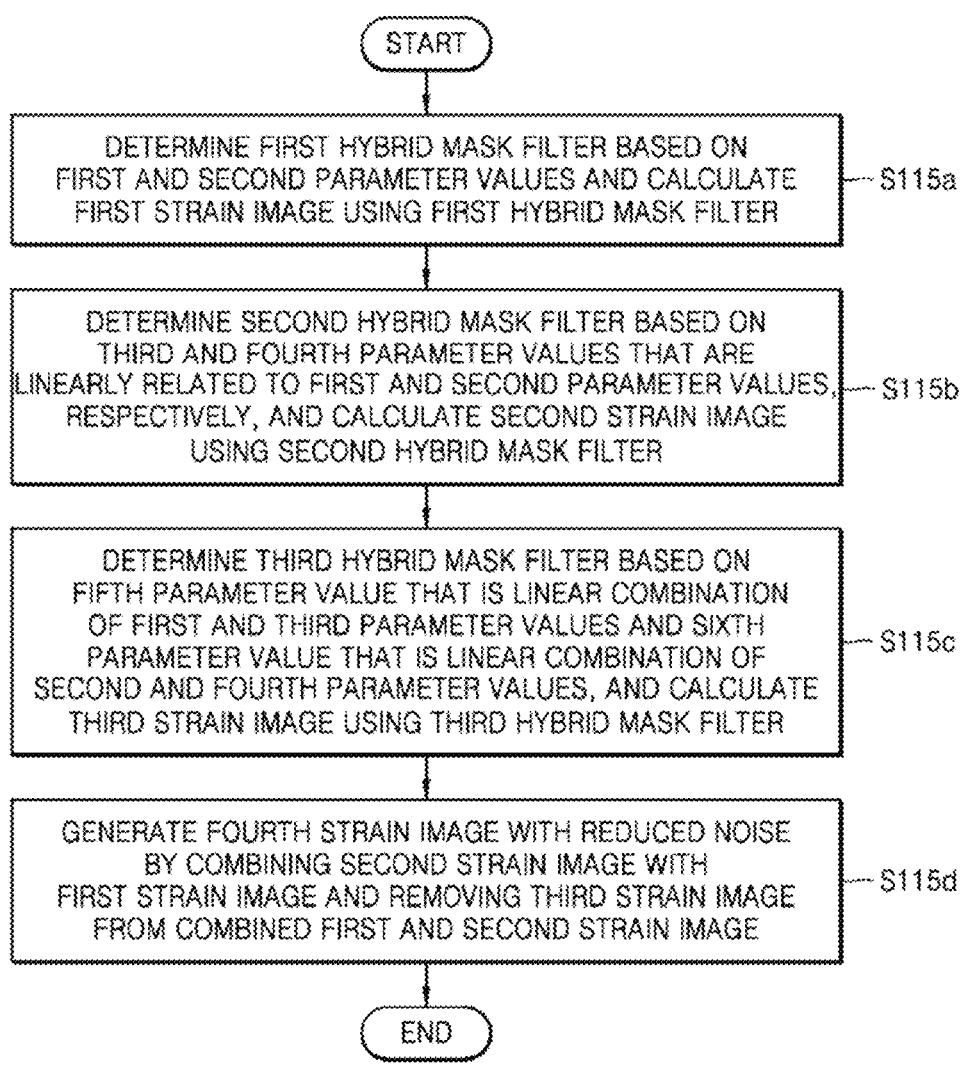

METHOD OF ANALYZING LATTICE STRAIN OF SEMICONDUCTOR DEVICE

CROSS-REFERENCE TO RELATED APPLICATION

This application claims priority under 35 U.S.C. § 119 from, and the benefit of, Korean Patent Application No. 10-2016-0087116, filed on Jul. 8, 2016 in the Korean Intellectual Property Office, the contents of which are herein incorporated by reference in their entirety.

BACKGROUND

Embodiments of the inventive concept are directed to a method of analyzing the lattice strain of a semiconductor device, and more particularly, to a method of analyzing the lattice strain of a semiconductor device as captured by a microscope.

In atoms that form a semiconductor device, a lattice space may vary due to stress. Mobility of electrons passing through the semiconductor device and the power consumption of the semiconductor device may vary depending on a variation in the lattice spacing of the atoms. Accordingly, a study on analyzing stress, which is applied to a semiconductor device, is required to improve a driving speed of the semiconductor device and reduce the power consumption of the semiconductor device.

One method of analyzing strain uses a geometric phase analysis (GPA) strain analysis technique applied to a high angle annular dark field scanning transmission electron microscope (HAADF-STEM) image. In existing commercial software, a cosine mask (or Tukey mask) is used as a mask filter that is applied to a spectrum image. As a size of the cosine mask increases, the spatial resolution of a strain image improves, although noise increases.

SUMMARY

Embodiments of the inventive concept can provide a method of analyzing the lattice strain of a semiconductor device with high resolution and high accuracy.

According to an embodiment of the inventive concept, there is provided a method of analyzing lattice strain of a semiconductor device, the method including: generating a spectrum image by performing a Fourier Transform on an image of a semiconductor device; providing a first hybrid mask filter designed to select at least one peak frequency from the spectrum image; filtering the spectrum image using the first hybrid mask filter to generate a filtered spectrum image; and generating a first strain image by performing an inverse Fourier Transform on the filtered spectrum image.

According to another embodiment of the inventive concept, there is provided a method of analyzing lattice strain of a semiconductor device, the method including: generating a spectrum image by performing a Fourier Transform on an image of a semiconductor device; filtering the spectrum image to select at least one peak frequency using a first hybrid mask filter to generate a filtered spectrum image; generating a first strain image by performing an inverse Fourier Transform on the filtered spectrum image; and generating a second image to reduce noise and generating a final strain image by combining or removing the second strain image with or from the first strain image.

According to another embodiment of the inventive concept, there is provided a method of analyzing lattice strain of a semiconductor device, the method including: generating a spectrum image by performing a Fourier Transform on an image of a semiconductor device; providing a first hybrid mask filter based on a hybrid function obtained by combining a plurality of different functions; wherein the plurality of functions comprise a Gaussian function and a Sigmoid function, and the hybrid function is represented by $$F(x) = Ke^{-2r^2} + (1-K)\frac{1}{1+e^r},$$

wherein K is a first parameter where 0<K<1 and $$r = \frac{x}{R},$$

and R is a second parameter where 0<R; and filtering the spectrum image to select at least one peak frequency using the first hybrid mask filter to generate a filtered spectrum image.

BRIEF DESCRIPTION OF THE DRAWINGS

FIG. 1A is a flowchart that illustrates a method of analyzing the lattice strain of a semiconductor device, according to an embodiment.

FIG. 1B is a flowchart that illustrates a method of optimizing first and second parameters included in a hybrid function in an operation of determining a hybrid mask filter illustrated in FIG. 1A, according to an embodiment.

FIG. 1C is a flowchart of a method of reducing ripple noise in an operation of generating a final strain image illustrated in FIG. 1A, according to an embodiment.

DETAILED DESCRIPTION OF EMBODIMENTS

Figure 2A:
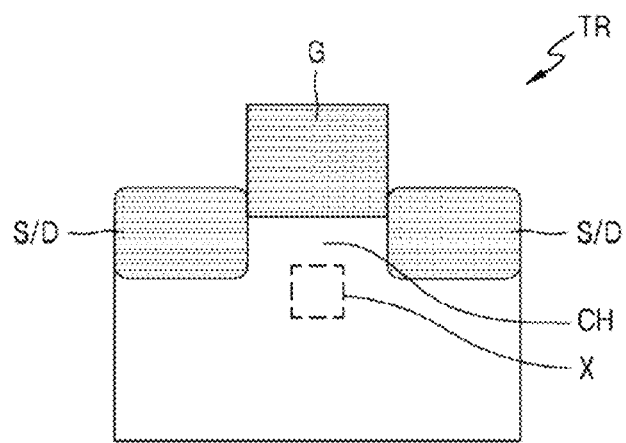
FIG. 2A is a cross-sectional view of a semiconductor device.

Embodiments of the inventive concept will now be described more fully hereinafter with reference to the accompanying drawings, in which exemplary embodiments of the inventive concept are shown. Like reference numerals may denote like elements in the drawings, and repeated descriptions for like elements may be omitted.

Figure 2B:
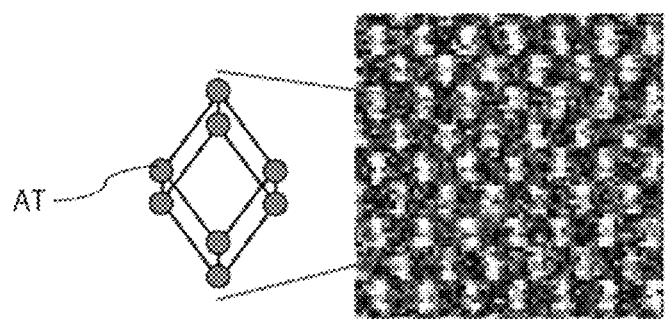
FIG. 2B is an image of a portion of a semiconductor device, captured by a transmission electron microscope (TEM), according to an embodiment.
Figure 3:
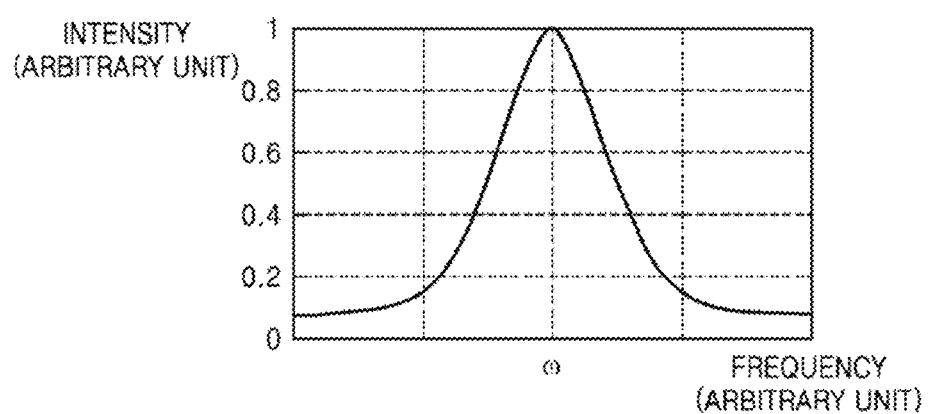
FIG. 3 is a graph of a hybrid function according to an embodiment.

FIG. 1A is a flowchart of a method of analyzing the lattice strain of a semiconductor device, according to an embodiment. FIG. 2A is a cross-sectional view of a semiconductor device, and FIG. 2B is an image of a region X of the semiconductor device, captured by a transmission electron microscope (TEM). FIG. 3 is a graph of a hybrid function according to an embodiment.

Referring to FIGS. 1A, 2A, and 2B, according to an embodiment, a TEM image can be acquired by photographing a semiconductor device, such as a transistor TR, and a spectrum image of the spatial frequencies of an atomic arrangement AT is generated by performing a Fourier Transform on the TEM image (operation S101).

According to an embodiment, the transistor TR includes source/drain regions S/D, a gate structure G between the source/drain regions S/D, and a channel region CH that contacts the gate structure G between the source/drain regions S/D. The channel region CH includes a semiconductor material, such as silicon Si, germanium Ge, or a combination thereof, but is not limited thereto. The channel region CH may be a monocrystal or a polycrystal, and a space between crystal lattices of the channel region CH can vary due to tensile or compression stress applied thereto. As the space between the crystal lattices of the channel region CH varies, mobility of carriers moving through the channel region CH and the power consumption of the transistor TR may vary. In detail, a PMOS transistor can be driven when a compression stress is applied to a channel region of the PMOS transistor, and an NMOS transistor can be driven when tensile stress is applied to a channel region of the NMOS transistor. In this manner, when strain occurs in the transistor TR due to stress, the strain can influence the driving of the transistor TR. Accordingly, the types of applied to the channel region CH stress should he accurately analyzed, along with the size of strain, when designing the transistor TR.

According to an embodiment, after the spectrum image is generated, a first hybrid mask filter is provided that selects a specific spatial frequency from the spectrum image (operation S103). The first hybrid mask filter is designed to select at least one peak frequency in the spectrum image. The first hybrid mask filter is based on a hybrid function that is a combination of a plurality of different functions. The plurality of functions include functions having characteristics contrary to each other, such as a function for noise reduction and a function for spatial resolution improvement. The noise reduction function can be a Gaussian function, and the spatial resolution improvement function can be a Sigmoid function. The hybrid function can be represented by EQ. (1).

$$F(x) = Ke^{-2r^2} + (1-K)\frac{1}{1+e^r} \quad (1)$$

Here, K is a first parameter where 0<K<1 and $$r = \frac{x}{R},$$

and R is a second parameter where 0<R. The first parameter is a weight of the Gaussian function in the hybrid function. The second parameter represents a degree of dispersion from a selected frequency.

The Gaussian function has excellent noise removal characteristics, and the Sigmoid function has excellent peak identification characteristics, that is, spatial resolution characteristics. Accordingly, the hybrid function has both excellent noise removal characteristics and excellent spatial resolution characteristics since it is obtained by a linear combination of the Gaussian function and the Sigmoid function. In some embodiments, when it is required that the noise removal characteristics are better than the spatial resolution characteristics, the first parameter may be selected in a range of K>0.5. In other embodiments, when the spatial resolution characteristics should be better than the noise removal characteristics, the first parameter is selected in a range of K<0.5. Although the hybrid function includes the Gaussian function and the Sigmoid function as an example, as described above, embodiments of the inventive concept are not limited thereto. The hybrid function may include various functions to reduce noise. Similarly, the hybrid function may include various functions to improve spatial resolution.

FIG. 3 is a graph of a hybrid function that is a linear combination of a Gaussian function and a Sigmoid function. As an example, the hybrid function is designed to select a first frequency ω.

Embodiments of the present inventive concept are based on geometric phase analysis (GPA) theory. GPA theory is a strain analysis method, and includes generating a spectrum image by performing a Fourier Transform on an image, selecting a specific frequency by applying a mask filter to the spectrum image, generating a complex image having complex values by performing an inverse Fourier Transform on the filtered spectrum image, and then generating a strain image by mathematically differentiating the phase image of the complex image.

In general, according to an embodiment, the mask filter used in a GPA strain analysis is a cosine function filter. In a cosine mask filter, there is a trade-off between spatial resolution characteristics and noise removal characteristics. Accordingly, when a parameter of cosine mask filter is changed, any one of the characteristics may deteriorate, and thus, the strain may not be accurately analyzed.

On the other hand, embodiments of a present inventive concept can provide both excellent noise removal characteristics and excellent spatial resolution characteristics by using a hybrid mask filter that is a linear combination of a Gaussian function and a Sigmoid function.

Referring back to FIG. 1A, according to an embodiment, when the first hybrid mask filter is prepared, values of the first and second parameters of the hybrid function are determined to determine the first hybrid mask filter. The first and second parameter values may be arbitrary values. In some embodiments, the method further includes determining the first and second parameters to optimize the noise removal characteristics and spatial resolution characteristics of a strain image generated by the first hybrid mask filter (operation S105). Operation S105 of optimizing the first and second parameters will be described below with reference to FIGS. 1B and 7.

Next, according to an embodiment, a filter spectrum image that includes only the frequency selected by the first hybrid mask filter is generated (operation S107).

Next, according to an embodiment, a strain image is generated by performing an inverse Fourier Transform on the filtered spectrum image (operation S109). In detail, after a complex-valued image is generated by performing an inverse Fourier Transform on the filtered spectrum image, a strain image is generated by mathematically differentiating a phase image of the complex-valued image.

Figure 4A:
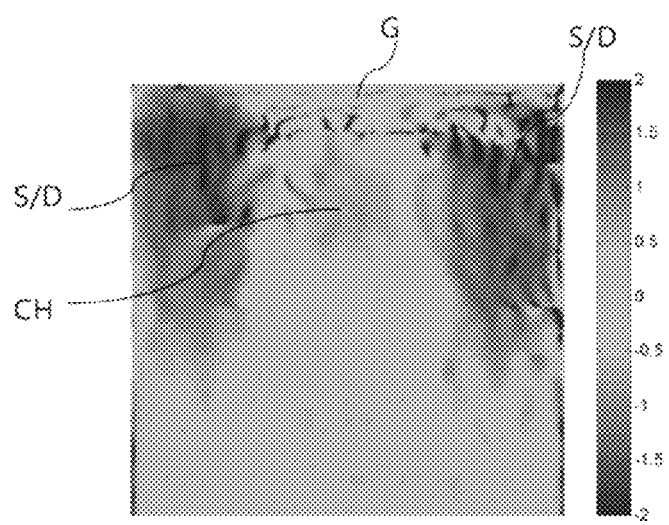
FIG. 4A is a is a strain image generated using a general mask filter, according to an embodiment.
Figure 4B:
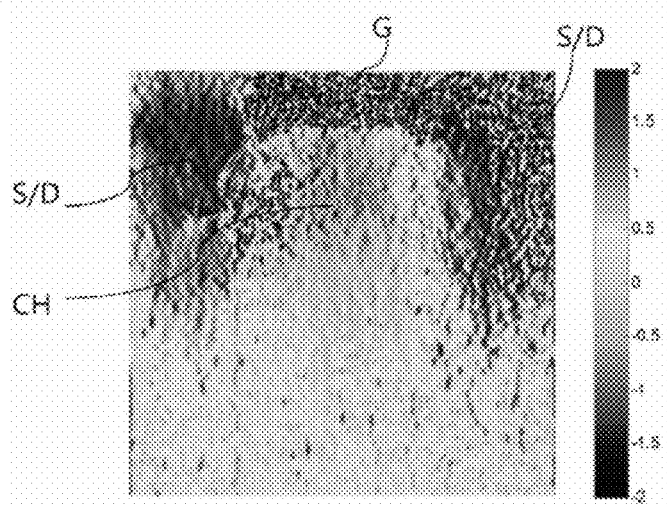
FIG. 4B is a strain image generated using a hybrid mask filter according to an embodiment.

FIG. 4A is a strain image generated using a general mask filter, and FIG. 4B is a strain image generated using a hybrid mask filter according to an embodiment.

Referring to FIGS. 2A, 4A, and 4B, according to an embodiment, a strain image of the source/drain regions S/D, the gate structure G, and the channel region CH of the transistor TR is shown. The strain image represents strain with greyscale from about −2% to about 2% based on strain strength. A region represented by a negative greyscale value is a region in which strain has occurred due to a compression stress. On the other hand, a region represented by a positive greyscale value is a region in which strain has occurred due to a tensile stress.

Referring to FIG. 4A, according to an embodiment, greyscales are not clearly distinguished in all regions, including the source/drain regions S/D, the gate structure G, and the channel region CH, and thus, the strain may not be analyzed. In other words, greyscale differentiation is not clear in boundaries between adjacent regions, and thus, strain occurring in boundaries between adjacent regions is not clearly shown. In addition, greyscales are not clearly distinguished in each region, and thus, a type of strain occurring in each region might not be identified. For example, the channel region CH is represented by a negative grayscale value, and thus, only an approximate analysis is possible that a compressed strain has occurred in the channel region CH. The channel region CH influences the driving of the transistor TR, and thus, an accurate strain analysis with respect to the channel region CH should be provided. Thus, a strain image generated using the general mask filter may not sufficient for a strain analysis of the channel region CH.

Referring to FIG. 4B, according to an embodiment, greyscales are clearly distinguished in all regions, including the source/drain regions S/D, the gate structure G, and the channel region CH. Greyscales are also clearly distinguished in boundaries between adjacent regions, and thus, it is possible to specifically analyze strain types occurring in boundaries between the adjacent regions. In addition, greyscales are clearly distinguishable in each region, and thus, it is possible to identify the type of strain occurring in each region.

According to an embodiment, a strain image may be represented numerically, that is, be digitized, to evaluate strain. Details will be described below with respect to FIGS. 5A to 5B.

Figure 5A:
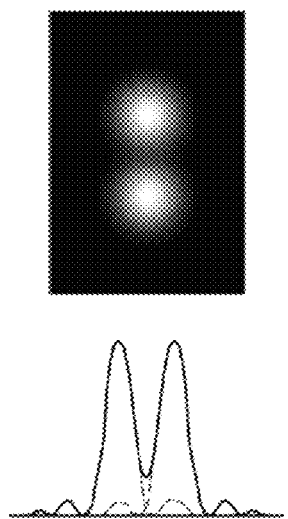
FIGS. 5A to 5C are images and graphs that illustrate how spatial resolution in a strain image is digitized, according to an embodiment.
Figure 5B:
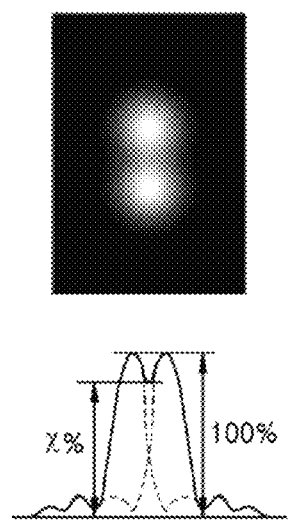
Figure 5C:
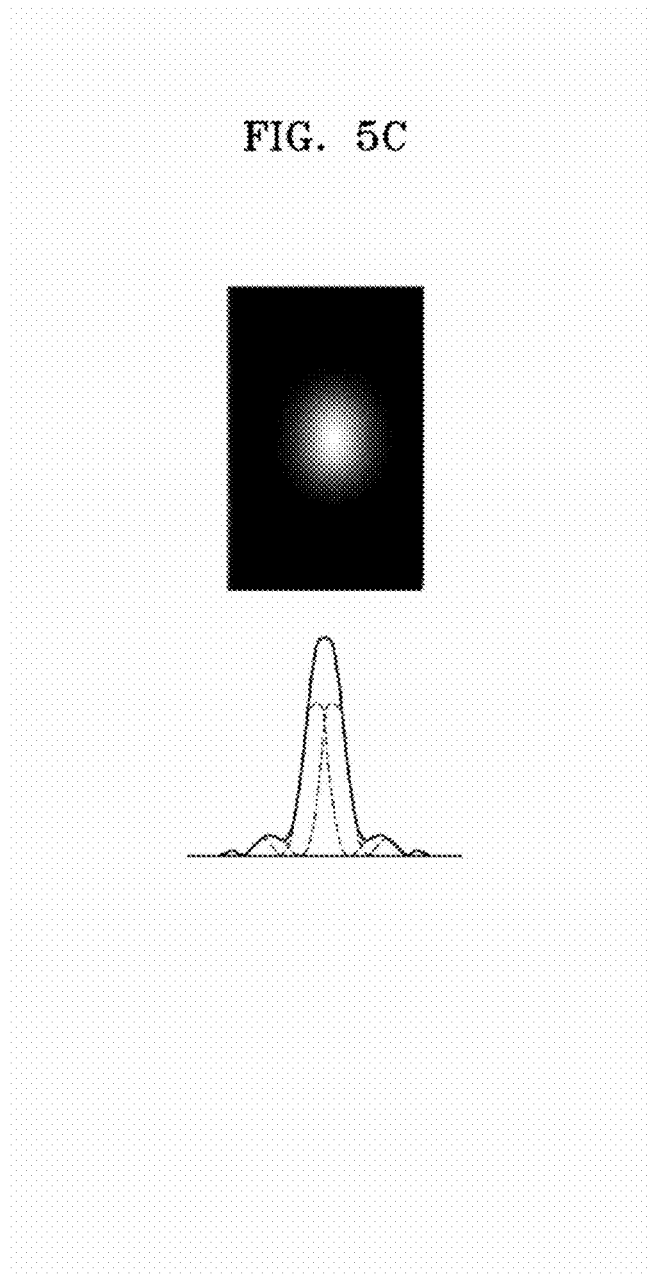
Figure 6A:
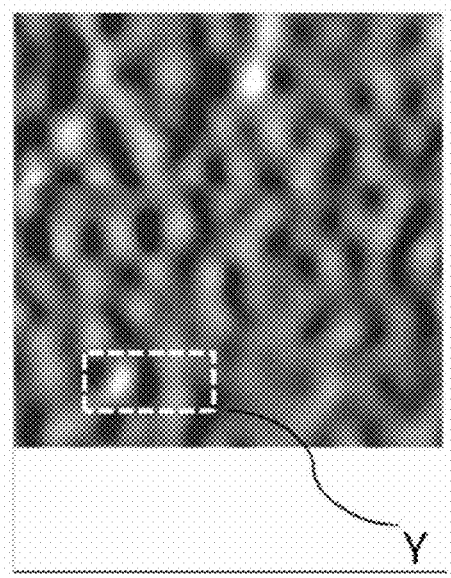
FIGS. 6A and 6B illustrate an operation of digitizing the spatial resolution of a strain image, according to an embodiment.
Figure 6B:
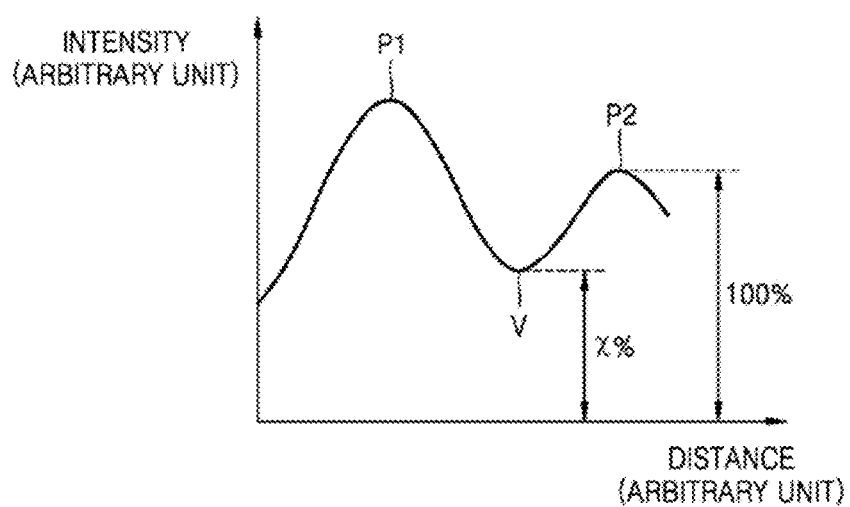

FIGS. 5A to 5C are images and graphs that illustrate how spatial resolution in a strain image is digitized. FIGS. 6A and 6B illustrate an operation of digitizing the spatial resolution of a strain image, according to an embodiment.

Referring to FIGS. 5A to 5C, according to an embodiment, the spatial resolution is defined as a minimum separation distance by which two peaks are differentiated from each other. In FIG. 5A, two peaks are clearly distinguishable from each other, and in FIG. 5C, two peaks are adjacent to each other to the extent that it is challenging to distinguish the two peaks from each other. In FIG. 5B, the differentiation between two peaks is ambiguous, and thus, it may be understood that two adjacent peaks are distinguishable from each other when a valley formed between the two adjacent peaks has an intensity value that is equal to or less than percentage x (%) of the intensity values of the two adjacent peaks, or on other words, a ratio x (%) of the intensity value of the valley to the intensity values of the two peaks is less than or equal to a predetermined value.

According to an embodiment, the ratio x (%) of the intensity value of the valley to the intensity values of the two peaks can be freely selected. In some embodiments, the spatial resolution is digitized by the Rayleigh Criterion. In this case, the first and second peaks P1 and P2 can be differentiated from each other when the valley V between the first and second peaks P1 and P2 has an intensity value that is about 74% of the intensity value of the lesser peak.

Referring to FIGS. 6A and 6B, according to an embodiment, it can be determined whether first and second peaks P1 and P2 shown in a region Y of the strain image are distinguishable from each other, and a separation distance between the first and second peaks P1 and P2 can be measured to digitize the spatial resolution of the strain image.

According to an embodiment, let the intensity of peak P2 be less than the intensity of peak P1. Then, when a valley V between the first and second peaks P1 and P2 has an intensity value that is equal to or less than a predetermined ratio x (%) compared to the second peak P2, it is determined that the first and second peaks P1 and P2 are distinguishable from each other. For example, according to the Rayleigh Criterion, a separation distance between the first and second peaks P1 and P2 is the spatial resolution of the strain image when the ratio x (%) is equal to or greater than about 74%.

In a present inventive concept, the spatial resolution of a strain image can be represented numerically. In addition, the reliability of the strain image can be evaluated by quantitatively representing the strain image using digitized spatial resolution.

Referring back to FIGS. 1A, 4A, and 4B, according to an embodiment, the spatial resolution of a first strain image is digitized by the method described above (operation S111).

FIG. 4A is a strain image generated using a general mask filter, and according to an experimental result, the spatial resolution of the strain image shown in FIG. 4A is measured to be about 9.46 nm. On the other hand, FIG. 4B is a strain image generated using a hybrid mask filter according to an embodiment, and the spatial resolution of the strain image shown in FIG. 4B is measured to be about 4.73 nm.

In this manner, according to an embodiment, a clear strain image can be generated using a hybrid mask filter according to an embodiment, and thus, it is possible to more accurately analyze strain. In addition, the spatial resolution of a strain image can be numerically digitized, and the reliability of the strain image can be quantitatively evaluated by using digitized spatial resolution.

In some embodiments, after the first strain image is generated (operation S109), a second strain image is generated to reduce noise in the first strain image (operation S115). In other words, a final strain image with reduced noise is generated by combining or removing the second strain image with or from the first strain image. Details will be described below with reference to FIGS. 10A to 11B.

FIG. 1B is a flowchart that illustrates a method of optimizing first and second parameters included in a hybrid function in an operation of determining a hybrid mask filter illustrated in FIG. 1A, according to an embodiment.

Referring to FIGS. 1A and 1B, according to an embodiment, after the spectrum image is generated by performing a Fourier Transform on an image of a semiconductor device acquired by TEM (operation S101), the first hybrid mask filter is provided that selects a specific spatial frequency from the spectrum image (operation S103). As described above, the first hybrid mask filter is based on a hybrid function that is a linear combination of a Gaussian function and a Sigmoid function.

Next, according to an embodiment, an objective function is defined to optimize a parameter of the hybrid function, and parameter values are determined by the objective function to optimize the first hybrid mask filter (operation S105).

According to an embodiment, the objective function is defined to appropriately balance the noise removal characteristics and spatial resolution characteristics of a strain image to be generated by the first hybrid mask filter. In other words, the objective function is defined so that a function value of the objective function increases when the strain image has a relatively small amount of noise and increases when the spatial resolution of the strain image decreases. The objective function can be defined by EQ. (2).

$$O(K,R)=1/\{(\text{spatial resolution})^{M1} \times (\text{noise})^{N1}\} \qquad (2)$$

Here, M1 and N1 are positive numbers. As described in EQ. (1), characteristics of the first hybrid mask filter vary depending on the first and second parameters of the hybrid function. Accordingly, characteristics of the first hybrid mask filter can be improved by selecting first and second parameter values when the objective function has a maximum value.

In detail, according to an embodiment, a plurality of preliminary strain images are calculated while arbitrarily varying the values of the first and second parameters (operation S105a). Next, the digitized spatial resolution and digitized noise are measured from the plurality of preliminary strain images (operation S105b). Based on the first and second parameter values and the digitized spatial resolution and digitized noise corresponding thereto, the objective function is mapped as a function of the first and second parameters (operation 105c). In this case, as described with reference to FIGS. 5A to 6B, the digitized spatial resolution can be determined from a separation distance between two adjacent peaks, and the digitized noise can be determined from a standard deviation of the hybrid function.

According to an embodiment, when the objective function has a maximum value, the first and second parameter values are determined based on a map of the objective function. In addition, an optimized hybrid mask filter is determined based on the optimized first and second parameter values (operation S105d).

Next, according to an embodiment, at least one peak frequency of the spectrum image is selected using the first hybrid mask filter (operation S107). Next, a strain image is generated by performing an inverse Fourier Transform on the filtered spectrum image (operation S109).

Figure 7:
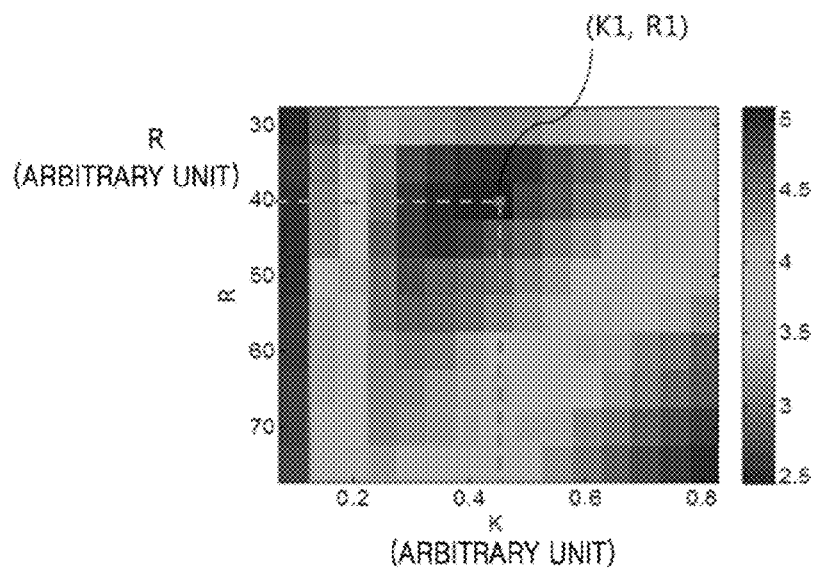
FIG. 7 illustrates a map of a hybrid function according to an embodiment.

FIG. 7 illustrates a map of a hybrid function according to an embodiment.

Referring to FIG. 7, according to an embodiment, values of an objective function are shown as a function of the first parameter K and the second parameter R of a hybrid function. The values of the objective function are represented on the map by intensities that range from about 2.5 to about 5.

According to an embodiment, the map of the objective function shows a grayscale corresponding to about 5 when a first parameter value K1 is about 0.45 and a second parameter value R1 is about 40. In other words, the objective function has a maximum value when the first parameter value K1 and the second parameter value R1 are about 0.45 and about 40. respectively, and a hybrid mask filter is optimized by the first parameter value K1 and the second parameter value R1.

Figure 8:
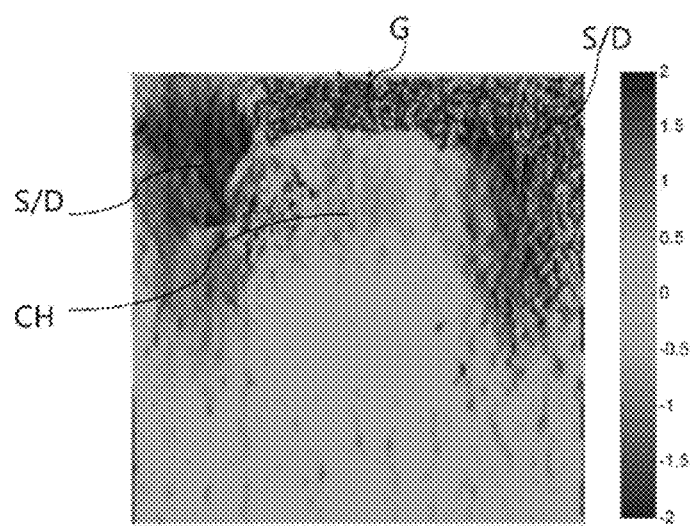
FIG. 8 is a strain image generated using a hybrid mask filter having an optimized parameter value, according to an embodiment.

FIG. 8 is a strain image generated using a hybrid mask filter having an optimized parameter value, according to an embodiment.

Referring to FIG. 8, according to an embodiment, although the same hybrid function is used, characteristics of the hybrid mask filter vary due to the first and second parameters in the hybrid function.

Figure 9A:
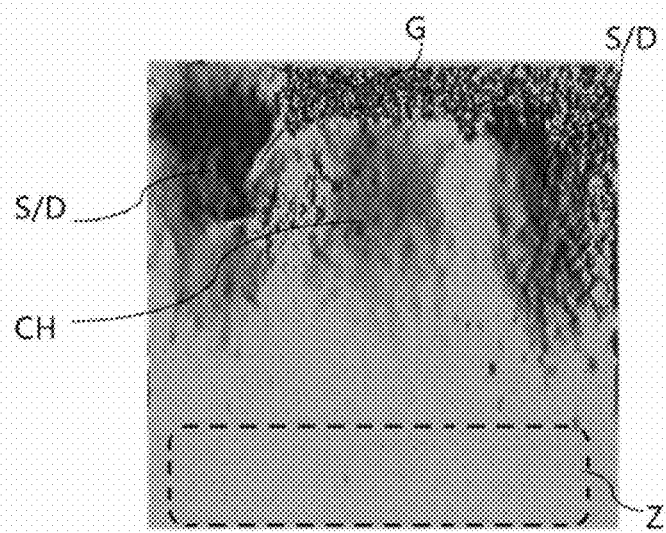
FIGS. 9A and 9B are strain images that include ripple noise, generated using a general mask filter, according to an embodiment.
Figure 9B:
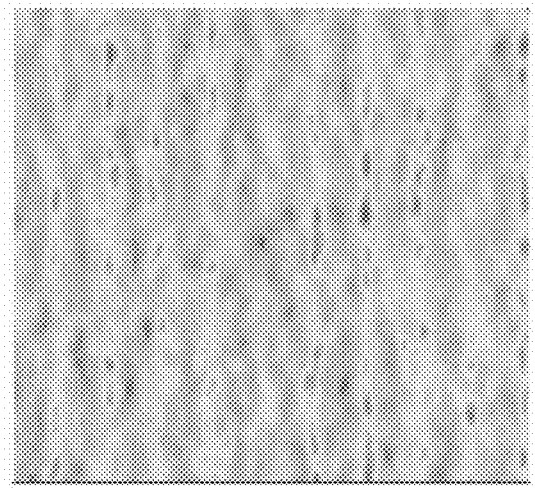

According to an embodiment, the strain image shown in FIG. 4B is generated by applying arbitrary first and second parameter values to a hybrid function, and in the strain image shown in FIG. 4B, spatial resolution is about 4.73 nm and a noise ratio is about 1.54%. FIGS. 9A and 9B show a strain image generated by applying optimized first and second parameter values to a hybrid function, and in the strain image shown in FIGS. 9A and 9B, spatial resolution is about 0.97 nm and a noise ratio is about 0.79%. As shown in FIGS. 9A and 9B, when optimized first and second parameter values are applied to a hybrid function, spatial resolution and noise characteristics can be improved.

Accordingly, according to an embodiment, a strain image can be more accurately analyzed by selecting parameters that improve characteristics of a hybrid mask filter by using an objective function.

FIG. 1C is a flowchart of a method of reducing ripple noise in operation 115 of generating a final strain image illustrated in FIG. 1A, according to an embodiment.

Referring to FIG. 1A, according to an embodiment, after the spectrum image is generated by performing a Fourier Transform on an image of a semiconductor device acquired by a TEM (operation S101), the first hybrid mask filter is prepared to select a specific spatial frequency from the spectrum image (operation S103). As described above, the first hybrid mask filter is based on a hybrid function that is a linear combination of a Gaussian function and a Sigmoid function. Next, the first hybrid mask filter is determined by optimizing parameters of the hybrid function (operation S105). Next, at least one frequency is selected from the spectrum image using the first hybrid mask filter (operation S107), and a first strain image is generated by performing an inverse Fourier Transform on the filtered spectrum image (operation S109).

Next, according to an embodiment, a second strain image is generated to remove ripple noise that remains in the first strain image. The second strain image may be combined with the first strain image or removed from the first strain image, and thus, a final strain image with reduced ripple noise (operation S115) can be generated. In addition, a further improved final strain image can be generated by generating a third strain image and combining the third strain image with the final strain image or removing the third strain image from the final strain image.

In detail, according to an embodiment, referring to FIG. 1C, the first hybrid mask filter is determined based on first and second parameter values, as described above, and the first strain image is generated using the determined first hybrid mask filter (operation S115a). The first and second parameter values may be optimized parameter values, but embodiments are not limited thereto. For example, the first and second parameter values may be arbitrary parameter values.

Next, according to an embodiment, a second hybrid mask filter is determined based on third and fourth parameter values are linearly related to the first and second parameter values, respectively, and a second strain image is generated using the second hybrid mask filter (operation S115b). Specifically, the first parameter value is related to the third parameter value by EQ. (3), and the second parameter value is related to the fourth parameter value by EQ. (4).

$$K_{low} = \frac{K_{high}}{A} \quad (3)$$

$$R_{low} = \frac{R_{high}}{A} \quad (4)$$

Here, $K_{high}$ denotes the first parameter value, $R_{high}$ denotes the second parameter value, $K_{low}$ denotes the third parameter value, $R_{low}$ denotes the fourth parameter value, and A denotes a first coefficient. The second strain image has reduced noise.

Next, according to an embodiment, a third hybrid mask filter is determined based on a fifth parameter value that is a linear combination of the first and third parameter values and a sixth parameter value that is a linear combination of the second and fourth parameter values, and a third strain image is generated using the third hybrid mask filter (operation S115c). Specifically, the fifth parameter value are related to the first and third parameter values by EQ. (5), and the sixth parameter value are related to the second and fourth parameter values by EQ. (6).

$$K_{noise} = \frac{(K_{high} + B * K_{low})}{2} \quad (5)$$

$$R_{noise} = \frac{(R_{high} + B * R_{low})}{2} \quad (6)$$

Here, $K_{noise}$ denotes the fifth parameter value, $R_{noise}$ denotes the sixth parameter value, and B denotes a second coefficient. The third strain image has amplified noise.

Next, according to an embodiment, by combining the second strain image, which has reduced noise, with the first strain image and removing the third strain image, which has amplified noise, from a strain image obtained by combining the second strain image with the first strain image, a fourth strain image with reduced ripple noise is generated (operation S115d).

In some embodiments, an operation of optimizing values of the first and second coefficients is further performed. In detail, the method of FIG. 1C further includes defining an objective function as represented by EQ. (7) using the digitized spatial resolution and digitized noise of the fourth strain image.

$$O(A,B) = 1/\{(\text{spatial resolution})^{M2} \times (\text{noise})^{N2}\} \quad (7)$$

Here, M2 and N2 are positive numbers.

Next, according to an embodiment, values of the objective function are calculated based on changes of the first and second coefficient values to map the objective function. When the objective function has a maximum value, the first and second coefficient values are determined from the map of the objective function. The third to sixth parameter values and the second and third hybrid mask filters are determined from optimized first and second coefficient values, and the fourth strain image is generated based on them.

Figure 10A:
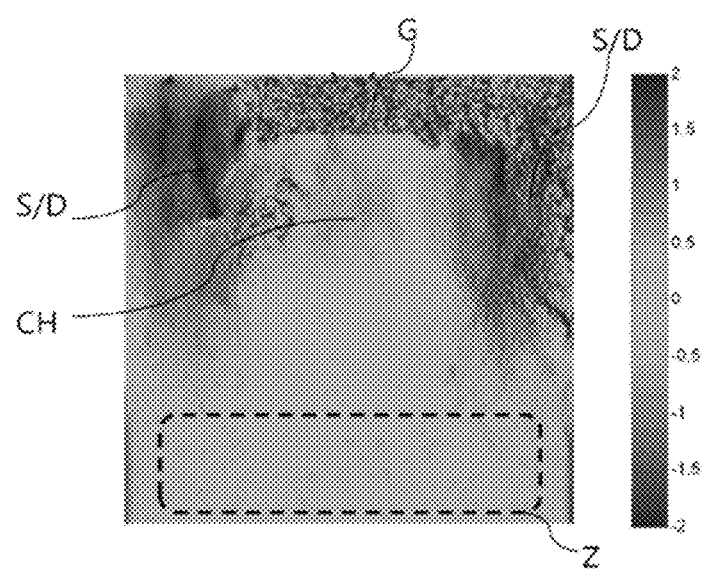
FIGS. 10A and 10B are strain images having reduced ripple noise, according to embodiments.
Figure 10B:
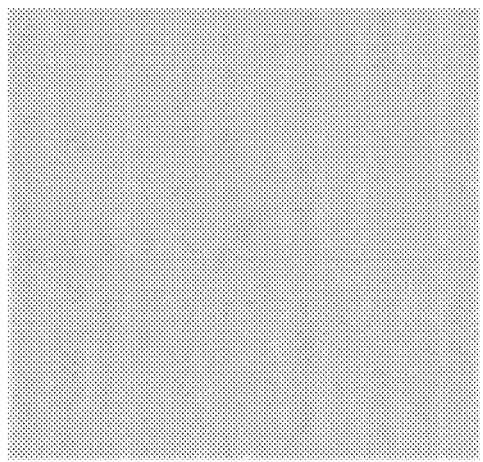

FIGS. 9A and 9B are strain images that include ripple noise, generated using a general mask filter. FIGS. 10A and 10B are strain images having reduced ripple noise, according to embodiments.

Referring to FIGS. 9A and 9B, according to an embodiment, ripple noise remains in a region Z under a channel region CH. A strain analysis can be disturbed by the ripple noises since it is challenging to distinguish the ripple noise from actual strain. On the other hand, referring to FIGS. 10A and 10B, in a strain image generated while reducing ripple noise, ripple noise has been removed from the region Z under the channel region CH. Accordingly, a clear strain image is generated, and thus, an accurate strain analysis can be performed.

In the descriptions provided above, it will be understood that although the terms first and second are used herein to describe various elements, these elements should not be limited by these terms. These terms are only used to distinguish one element from another element.

While embodiments of the inventive concept has been particularly shown and described with reference to exemplary embodiments thereof it will be understood that various changes in form and details may be made therein without departing from the spirit and scope of the following claims.

What is claimed is:

1. A method of analyzing lattice strain of a semiconductor device, the method comprising:
generating a spectrum image by performing a Fourier Transform on an image of a semiconductor device;
providing a first hybrid mask filter based on a hybrid function obtained by combining a plurality of different functions, wherein the plurality of different functions comprise a first function for noise reduction and a second function for spatial resolution improvement;
filtering the spectrum image using the first hybrid mask filter to generate a filtered spectrum image; and
generating a first strain image by performing an inverse Fourier Transform on the filtered spectrum image.

2. The method of claim 1, wherein the first function comprises a Gaussian function and the second function comprises a Sigmoid function, and the hybrid function is represented by $$F(x) = Ke^{-2r^2} + (1-K)\frac{1}{1+e^r},$$

wherein is a first parameter where 0<K<1 and $$r = \frac{x}{R},$$

and R is a second parameter where 0<R.

3. The method of claim 1, further comprising digitizing spatial resolution and noise of the first strain image.

4. The method of claim 3, wherein the spatial resolution is a minimum separation distance by which two peaks in the first strain image are distinguished from each other, and the digitized noise is determined from a standard deviation of the hybrid function.

5. The method of claim 4, wherein the two peaks have a valley therebetween, which has an intensity value equal to or less than a predetermined percentage of a lesser intensity value of intensity values of the two peaks.

6. The method of claim 3, wherein the spatial resolution is digitized by the Rayleigh Criterion.

7. The method of claim 1, wherein designing the first hybrid mask filter comprises calculating preliminary strain images based on arbitrary first and second parameter values for the first and second parameters, measuring a digitized spatial resolution and digitized noise from the plurality of preliminary strain images, and defining an objective function O(K, R) =1/{(spatial resolution)$^{M1}$×(noise)$^{N1}$} using the digitized spatial resolution and digitized noise of the preliminary strain images, where M1 and N1 are positive numbers.

8. The method of claim 7, wherein designing the first hybrid mask filter further comprises determining the first parameter value and the second parameter value from a map of the objective function when the objective function has a maximum value, to determine the first hybrid mask filter.

9. The method of claim 7, further comprising mapping the objective function as function of the first and second parameters.

10. The method of claim further comprising
generating a second hybrid mask filter from third and fourth parameter values that are linearly related to arbitrary values of the first and second parameters, respectively and
generating a third strain image by removing a second strain image generated using the second hybrid mask filter from the first strain image.

11. The method of claim 1, further comprising
determining a second hybrid mask filter from a third parameter value related to a first parameter value used to generate the first strain image by EQ. (1), and a fourth parameter value related to a second parameter value used to generate the first strain image by EQ. (2),
determining a third hybrid mask filter from a fifth parameter value related to the first and third parameter values by EQ. (3), and a sixth parameter value related to the second and fourth parameter values by EQ. (4),
wherein $$K_{low} = \frac{K_{high}}{A} \quad (1)$$

$$R_{low} = \frac{R_{high}}{A} \quad (2)$$

$$K_{noise} = \frac{(K_{high} + B * K_{low})}{2} \quad (3)$$

$$R_{noise} = \frac{(R_{high} + B * R_{low})}{2}, \quad (4)$$

wherein $K_{high}$ denotes the first parameter value, $R_{high}$ denotes the second parameter value, $K_{low}$ denotes the third parameter value, $R_{low}$ denotes a fourth parameter value, $K_{noise}$ denotes the fifth parameter value, $R_{noise}$ denotes the sixth parameter value, A denotes a first coefficient, and B denotes a second coefficient, and
generating a fourth strain image by combining a second strain image generated using the second hybrid mask filter with the first strain image and removing a third strain image generated using a third hybrid mask filter from a combined strain image.

12. The method of claim 11, further comprising defining an objective function O(A, B) =1/{(spatial resolution)$^{M2}$×(noise)$^{N2}$} using digitized spatial resolution and digitized noise of the fourth strain image, where M2 and N2 are positive numbers.

13. The method of claim 1, further comprising calculating values of the objective function based on changes of the first and second coefficient values to map the objective function, and determining the first and second coefficient values from the map of the objective function when the objective function has a maximum value.

14. A method of analyzing lattice strain of a semiconductor device, the method comprising:
generating a spectrum image by performing a Fourier Transform on an image of a semiconductor device;
filtering the spectrum image to select at least one peak frequency using a first hybrid mask filter to generate a filtered spectrum image;
generating a first strain image by performing an inverse Fourier Transform on the filtered spectrum image; and
generating a second strain image to reduce noise and generating a final strain image by combining or removing the second strain image with or from the first strain image.

15. The method of claim 14, further comprising digitizing spatial resolution and noise of at least one of the first strain image, the second strain image, and the final strain image.

16. The method of claim 14, wherein the first hybrid mask filter is based on a hybrid function obtained by combining a plurality of different functions, wherein the plurality of functions comprise a Gaussian function and a Sigmoid function, and the hybrid function is represented by $$F(x) = Ke^{-2r^2} + (1-K)\frac{1}{1+e^r},$$

wherein K is a first parameter where 0<K <1 and $$r = \frac{x}{R},$$

and R is a second parameter where 0<R, wherein the first and second parameters are determined to optimize noise removal characteristics and spatial resolution characteristics of a filtered image generated by the first hybrid mask filter.

17. A method of analyzing lattice strain of a semiconductor device, the method comprising:
generating a spectrum image by performing a Fourier Transform on an image of a semiconductor device;
providing a first hybrid mask filter based on a hybrid function obtained by combining a plurality of different functions, wherein the plurality of functions comprise a Gaussian function and a Sigmoid function, and the hybrid function is represented by $$F(x) = Ke^{-2r^2} + (1-K)\frac{1}{1+e^r},$$

wherein K is a first parameter where 0<K <1 and $$r = \frac{x}{R},$$

and R is a second parameter where 0<R; and
filtering the spectrum image to select at least one peak frequency using the first hybrid mask filter to generate a filtered spectrum image.

18. The method of claim 17, further comprising generating a first strain image by performing an inverse Fourier Transform on the filtered spectrum image, and generating a second strain image to reduce noise and generating a final strain image by combining or removing the second strain image with or from the first strain image.

19. The method of claim 17, wherein the first hybrid mask filter is designed to select at least one peak frequency from the spectrum image, wherein designing the first hybrid mask filter comprises:
calculating preliminary strain images based on arbitrary first and second parameter values for the first and second parameters,
measuring a digitized spatial resolution and digitized noise from the plurality of preliminary strain images,
defining an objective function $O(K, R)=1/\{(\text{spatial resolution})^{M1} \times (\text{noise})^{N1}\}$ using the digitized spatial resolution and digitized noise of the preliminary strain images, where M1 and N1 are positive numbers,
mapping the objective function as a function of the first and second parameters, and
determining the first parameter value and the second parameter value from the map of the objective function when the objective function has a maximum value, to determine the first hybrid mask filter.

* * * * *